US006994381B1

(12) United States Patent
Shade et al.

(10) Patent No.: US 6,994,381 B1
(45) Date of Patent: Feb. 7, 2006

(54) STAB JOINT COUPLING

(75) Inventors: James W. Shade, Middletown, OH (US); Thomas A. Nein, Catlettsburg, KY (US)

(73) Assignee: Contech Construction Products Inc., West Chester, OH (US)

( * ) Notice: Subject to any disclaimer, the term of this patent is extended or adjusted under 35 U.S.C. 154(b) by 0 days.

(21) Appl. No.: 09/620,177

(22) Filed: Jul. 20, 2000

(51) Int. Cl.
*F16L 17/00* (2006.01)

(52) U.S. Cl. .................. 285/369; 285/231; 285/903
(58) Field of Classification Search ............... 285/903, 285/369, 231
See application file for complete search history.

(56) References Cited

U.S. PATENT DOCUMENTS

| 458,994 | A | | 9/1891 | Bieber |
|---|---|---|---|---|
| 926,532 | A | | 6/1909 | Wilson |
| 1,227,187 | A | | 5/1917 | Olcott |
| 1,829,236 | A | * | 10/1931 | Perkins ..................... 285/229 |
| 1,839,761 | A | | 1/1932 | Hutton |
| 2,095,702 | A | | 10/1937 | Johnson |
| 2,787,442 | A | | 4/1957 | Lewis |
| 2,821,768 | A | | 2/1958 | Beckham et al. |
| 3,028,290 | A | | 4/1962 | Roberts et al. |
| 3,131,954 | A | | 5/1964 | Kramer et al. |
| 3,239,254 | A | | 3/1966 | Campbell |
| 3,298,721 | A | | 1/1967 | Wiley |
| 3,501,179 | A | | 3/1970 | Boynton et al. |
| 3,662,579 | A | | 5/1972 | Lewis |
| 3,669,473 | A | | 6/1972 | Martin et al. |
| 3,708,187 | A | | 1/1973 | Campbell |
| 3,708,867 | A | | 1/1973 | Meserole |
| 3,758,139 | A | | 9/1973 | Meserole |
| 3,782,763 | A | | 1/1974 | Henrickson |
| 3,873,138 | A | * | 3/1975 | Griffiths et al. ............. 285/233 |
| 3,899,198 | A | | 8/1975 | Maroschak |
| 3,951,439 | A | | 4/1976 | Schmunk |
| 4,061,368 | A | | 12/1977 | Auriemma |
| 4,124,236 | A | | 11/1978 | Guidry |
| 4,141,576 | A | * | 2/1979 | Lipke et al. ................ 285/369 |
| 4,149,740 | A | | 4/1979 | Hall |
| 4,174,985 | A | | 11/1979 | Buidry |
| 4,176,865 | A | | 12/1979 | Felton et al. |
| 4,273,367 | A | | 6/1981 | Keeney et al. |
| 4,288,108 | A | | 9/1981 | Streit |
| 4,360,227 | A | | 11/1982 | Bridges |
| 4,362,187 | A | | 12/1982 | Harris et al. |

(Continued)

FOREIGN PATENT DOCUMENTS

CA            769622       10/1967

(Continued)

*Primary Examiner*—Robert A. Siconolfi
*Assistant Examiner*—Bradley T. King
(74) *Attorney, Agent, or Firm*—Wood, Herron & Evans, LLP

(57) ABSTRACT

A pipe coupling for joining adjacent ends of first and second pipe sections. The coupling includes a generally cylindrical sleeve having first and second sides. The sleeve is formed as a sheet which is rolled to form the sleeve, wherein the first side of the sleeve defines a substantially continuous annular corrugation to cooperatively engage an end of a first pipe section. The connection of the pipe coupling to the first pipe section end occurs at a factory. The second side of the sleeve is in the form of a bell and defines a non-corrugated surface which is adapted to slidably receive an end of the second pipe section in the field, to thereby interconnect the adjacent ends of pipe. Gaskets may be provided to further reduce infiltration or exfiltration at the coupling.

30 Claims, 4 Drawing Sheets

U.S. PATENT DOCUMENTS

| | | |
|---|---|---|
| 4,443,031 A | 4/1984 | Borsh et al. |
| 4,466,642 A | 8/1984 | Tonchen |
| 4,524,999 A | 6/1985 | Pate et al. |
| 4,664,428 A | 5/1987 | Bridges |
| 4,799,287 A | 1/1989 | Belanger et al. |
| 4,865,357 A | 9/1989 | Brinegar |
| 4,903,996 A | 2/1990 | Herr |
| 4,922,583 A | 5/1990 | Wentworth |
| 4,969,670 A * | 11/1990 | Bonnema et al. ........... 285/319 |
| 5,257,836 A | 11/1993 | Smith |
| 5,294,190 A | 3/1994 | Feldmann et al. |
| 5,326,138 A | 7/1994 | Claes et al. |
| 5,335,945 A | 8/1994 | Meyers |
| 5,383,693 A | 1/1995 | Shade |
| 5,415,436 A | 5/1995 | Claes et al. |
| 5,415,440 A | 5/1995 | Kanao |
| 5,478,123 A | 12/1995 | Kanao |
| 5,644,832 A | 7/1997 | Kanao |
| 5,765,880 A | 6/1998 | Goddard |
| 5,799,703 A * | 9/1998 | Kanao et al. ................ 138/121 |
| 5,842,727 A * | 12/1998 | Shade .................... 285/148.19 |
| 5,924,282 A | 7/1999 | Thomas |

FOREIGN PATENT DOCUMENTS

| | | |
|---|---|---|
| CH | 349784 | 12/1960 |
| FR | 1488423 | 6/1967 |
| JP | 61-222725 | * 10/1986 |
| JP | 6-185681 | * 7/1994 |
| JP | 8-145261 | * 8/1996 |
| JP | 11-270765 | * 10/1999 |
| WO | WO 00/53965 | * 9/2000 |

* cited by examiner

US 6,994,381 B1

STAB JOINT COUPLING

FIELD OF THE INVENTION

The present invention relates generally to pipe couplings and, more particularly, to couplings of the type used to join abutting ends of two pipe sections in the field.

BACKGROUND OF THE INVENTION

Spiral corrugated pipe is widely used in the construction industry to make drainage conduits for water, sewage and other types of effluents. These systems may be located along or beneath highways, or for various other construction projects where diversion of water flow or drainage of runoff is required. Typically, the spiral corrugated pipe is manufactured of metal, plastic, or any other suitable material which has sufficient strength, durability and resistance to deterioration for a given application. Depending on the size and nature of the project, the dimensions of the corrugated pipe sections used to form the drainage system may vary. In order to construct the desired length of conduit, sections of spiral corrugated pipe are typically laid in end-to-end abutting relationships and then the adjacent ends are interconnected by pipe couplings to form a substantially fluid or soil tight seal at each joint of the constructed fluid conduit.

Couplings for joining sections of pipe must meet the same performance requirements as the individual sections of pipe. The connection must be soil-tight and it must not permit water to flow out at such a volume and velocity as to cause undue settling or erosion of the soil surrounding the pipe. If the pipe is to be situated below the water table, the pipe joints must also preclude the ingress of water. Furthermore, pipe joints must be sufficiently rigid to maintain the proper alignment of the joined pipe sections. Varying pressures on the ground above the joint pipe sections must not adversely affect the desired alignment. In addition to being able to withstand certain performance requirements, it would be advantageous to develop a coupling having an ease of use in the field.

Many different pipe coupling configurations are known in the art for interconnecting adjacent ends of pipe. For example, U.S. Pat. No. 3,501,179 issued to Boynton discloses a pipe coupling for adjoining adjacent re-corrugated ends of helical formed pipe. In this coupling, a flat band is tensioned about the adjacent ends of the pipe sections to form a continuous surface-to-surface seal about the entire circumference of the abutting pipe section ends. The surface-to-surface seal is provided by contact of the inner surface of the band and the outer surface of at least one of the annular corrugations formed on the re-corrugated pipe sections ends. A continuous surface-to-surface seal is provided about the entire circumference of each abutting end of the pipe sections when the ends of the bands are tensioned together. Resilient rings, such as soft rubber "O" rings, may be provided in the annular corrugations of the pipe sections to improve the surface-to-surface seal provided by the band.

U.S. Pat. No. 4,149,740 issued to Hall discloses a pipe coupling for joining adjacent ends of re-corrugated pipe sections. The pipe coupling includes a pair of semi-circular pipe sections that are mounted about the ends of the adjacent pipe sections. The semi-circular sections of the pipe coupling have annular corrugations that are adapted to engage with annular corrugations on the re-corrugated pipe section ends to securely couple the pipe lengths together.

U.S. Pat. No. 4,176,865 issued to Felton discloses a pipe coupling for providing a fluid tight seal between adjacent ends of re-corrugated pipe sections. The pipe coupling is formed as a pair of inner and outer flat bands that encircle the adjacent pipe section ends. The inner band provides a continuous surface-to-surface seal with the crests of the annular corrugations formed in the pipe section ends. The second or outer band overlies the inner band and is provided with cooperating loops and bolts for tensioning the outer band about the inner band to form a continuous surface-to-surface seal. The inner bands may be formed with annular corrugations to engage annular corrugations on the re-corrugated pipe section ends. Additionally, resilient rings may be provided within one of the annular corrugations on each of the re-corrugated pipe section ends.

While some prior art couplings have proved satisfactory for some applications of corrugated spiral pipe, one disadvantage of the current couplings is that they require the worker in the field to perform many difficult physical manipulations in order to effect the coupling of two adjacent sections of pipe. For example, regarding those cylindrical couplings which are already formed for application in the field, first the end of a section of pipe must be screwed into the coupling so that an annular ridge is positioned in an annular groove. Next, the coupling must be maintained at a fixed position while the adjacent section of pipe is swung in line with the coupling. Finally, at the same time as the pipe end is being swung in line with the coupling, the pipe end must be connected to the coupling. The difficulty involved in performing these manipulations increases with the diameter and weight of the pipes to be joined. Furthermore, the coupling of a plurality of pipes using such a coupling device is time consuming and requires excessive manpower.

Other prior art couplings require the cylindrical coupling to be formed in the field. This process requires a band to be rolled about and secured to two adjacent ends of pipe in the field. In order to accomplish this task, two adjacent ends of re-corrugated spiral pipe must be positioned and maintained in end-to-end relationship. Next, a flat band or sheet must be wrapped simultaneously around both pipe ends. The difficulty of this task is often increased by the need to match corrugations on the sheet with corrugations on the adjacent pipe ends. After the sheet has been wrapped around the pipe ends, it is tensioned in order to form a soil tight and/or water tight seal. Finally, the coupling is secured about the adjacent pipe ends by means such as welding or mechanical fasteners. This process is arduous and time consuming.

Thus, there exists a need for a coupling particularly adapted for joining adjacent ends of spiral re-corrugated pipe which is easy to install in the field without requiring extensive manipulation of the pipe ends. Moreover, there exists a need for a spiral corrugated pipe coupling which does not require complicated connections to form a connection at the pipe joint. Additionally, there is a need for a spiral corrugated pipe coupling which does not require simultaneously interconnecting two adjacent ends of pipe in the field.

SUMMARY OF THE INVENTION

The present invention overcomes the above-mentioned disadvantages of the present state of the art for joining sections of drainage pipe by providing a high-strength coupling to use as a stab joint between two adjacent sections of pipe, at least one section having an annular corrugation on at least one end. The coupling is formed from flat stock as a sheet of metal, plastic or other material having opposite edges for rolling into a generally cylindrical sleeve of desired diameter. This sleeve includes a first side and a second side. The first side of the sleeve is manufactured with one or more annular corrugations that cooperatively engage with one or more annular corrugations disposed on a re-corrugated end of a first section of helical-formed pipe. The second side of the sleeve is formed into a bell having an inside diameter that is greater than the outside diameter of a second section of re-corrugated helical-formed pipe. The bell includes an entry flare, and is adapted to slidably receive the end of the second section of pipe. The inner surface of the bell is substantially smooth and is free of corrugations.

According to the method of this invention, a corrugation is formed across the width of a flat sheet. The sheet with corrugation is rolled into a cylindrical sleeve and is secured about the first section of pipe to form the coupling in such a manner that the first side of the sleeve cooperatively engages the corrugated end of the first section of pipe. The first side of the sleeve is secured about the first pipe section by various means. This occurs during production and processing of the first section of pipe at the site of manufacture. The first section of pipe with attached coupling is then transported to the field, where the second pipe section is coupled to the bell by simply sliding the second pipe section into the bell.

Due to the coupling of the present invention, complex manipulations are not required to simultaneously engage both pipe ends in the field and the coupling process can thus be performed relatively inexpensively and quickly by workers in the field. Since one pipe section is joined to the coupling at the manufacturing plant, all that is required of workers in the field is to slide the second pipe section into the bell. This coupling step does not require the use of mechanical fasteners or tools. In addition, the coupling of the present invention maintains several advantages of couplings. The coupling provides a conduit that will not impede the flow of fluids through coupled pipes. Furthermore, the coupling provides a soil tight seal. In addition, the present invention does not require that the pipes be cut to a predetermined length in order to effect coupling. The connectors may be used to join pipes of any sufficient length that allows the connectors to be securely connected to the pipes.

Additionally, a radially, inwardly directed annular projection may be formed into the bell. This annular projection comprises a small corrugation formed on the bell that will permit the joint to be assembled, but will restrain the assembled first and second pipe sections from separating in the field. In particular, the annular projection includes a gentle entry side angle to permit a second pipe section end including a fluted gasket to compress and slide over the annular projection. The annular projection also includes a steep back side angle that creates a stop to engage the compressed fluted gasket and prevent disengagement of the assembled joint.

In order to ensure a soil tight and/or water tight seal between the second section of pipe and the bell, the fluted gasket may be disposed circumferentially around the second pipe section. The fluted gasket forms a seal by filling the annular space between the inner diameter of the bell and the outer diameter of the second pipe section. The fluted gasket also contacts and confronts the inner surface of the bell to aid in restraining the second section of pipe within the sleeve.

In addition, to the fluted gasket disposed on the second section of pipe, other gaskets may be disposed on the first pipe section in order to enhance the seal. Exemplary of these types of gaskets are O-ring gaskets and flat gaskets. A typical O-ring gasket has a continuous "O" shape, with a circular cross section. A typical flat gasket has a top and a bottom surface that are generally parallel and two side edges, giving the gasket a generally rectangular cross section.

When O-ring gaskets are used to create a seal between the first section of pipe and the first side of the sleeve, the O-ring is disposed in an annular groove of the first pipe section. When the first side of the sleeve is rolled around the first section of pipe, the O-ring gasket is disposed between the sleeve and first pipe section so as to abut the annular groove of the first pipe section, and a portion of the inside surface of the first side of the sleeve.

When flat gaskets are used to create a seal between the first section of pipe and the first side of the sleeve, the flat gasket is located circumferentially around the first pipe section in between an annular groove of one corrugation of the first pipe section and a corresponding and engaging annular ridge of a corrugation of the first side of the sleeve.

In addition to gaskets, sealants may be used to further seal the connection between the corrugations of the first side of the sleeve and the corrugations of the first pipe section.

The above features and advantages of the present invention will be better understood with reference to the accompanying figures and detailed description. It will also be understood that the particular drawings illustrating the invention are exemplary only and are not to be regarded as limitations of the invention.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the principles of the invention.

DETAILED DESCRIPTION

Figure 1A:
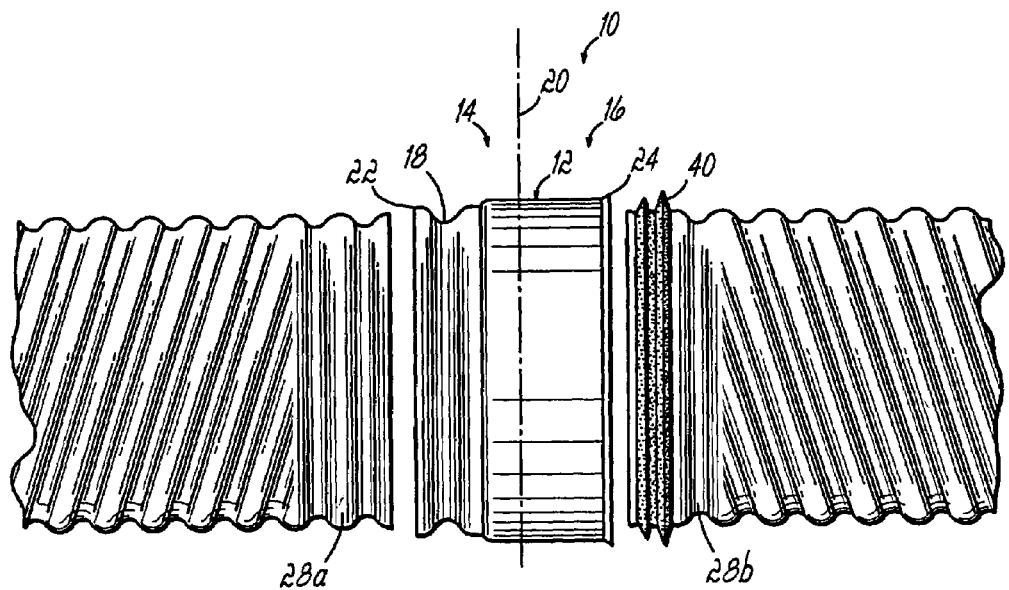
FIG. 1A is a perspective view of a coupling of the present invention in the environment of first and second sections of spiral corrugated pipe.
Figure 1B:
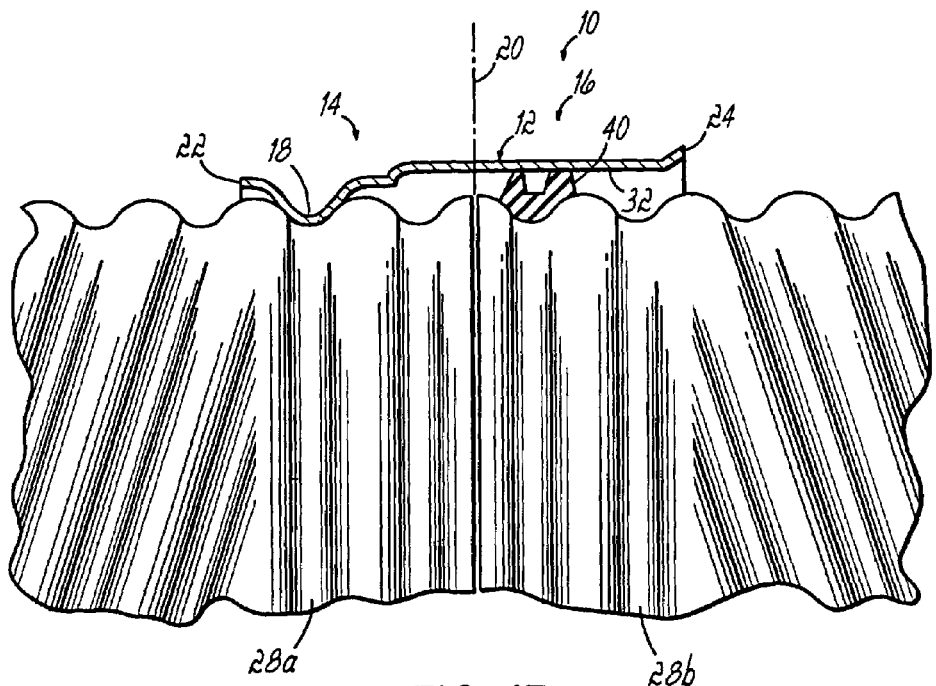
FIG. 1B is a cutaway view of a coupling of the present invention depicting a fluted gasket disposed about the circumference of one end of spiral corrugated pipe.

With reference to the figures, and to FIGS. 1A and 1B in particular, a coupling 10 in accordance with one embodiment of the present invention is shown for joining or interconnecting adjacent ends of spiral re-corrugated pipe. While the illustrated embodiment depicts spiral re-corrugated pipe, it should be noted that the coupling 10 of the present invention may be used to interconnect any type of pipe having an annular corrugation. Coupling 10 includes a generally cylindrically shaped sleeve 12, preferably made of rigid plastic or metal, having a first side 14 and a second side in the form of a bell 16. The first side 14 preferably defines a substantially annular corrugation 18 which extends between the midline 20 of the sleeve 12 and a free edge 22 of the first side 14. The bell 16 preferably defines a non-corrugated section of the sleeve 12 extending substantially between the midline 20 and a free edge 24 of the sleeve 12. The free edge 24 of the bell 16 is formed as an entry flare. The first side 14 with the annular corrugation 18 is formed from a sheet of flat stock. This sheet (not shown), with at least one groove disposed across its width, is wrapped into sleeve 12 and secured about a first pipe section 28a. As the sheet is secured around the first pipe section 28a, the annular corrugation 18 cooperatively engages at least one corrugation of the first section of pipe 28a. While the Figures depict annular corrugation 18 cooperatively engaging the second corrugation from the end of first pipe section 28a, it should be noted that annular corrugation 18 may engage any annular corrugation on first pipe section 28a. The first side 14 of sleeve 12 is secured to first section of pipe 28a by various means. For example, first side 14 of sleeve 12 may be attached to first pipe section 28a by an angle (not shown) or similar fastener welded or otherwise attached to the sleeve 12, and the sleeve 12 is tightened onto the first pipe section 28a with bolts at the plant prior to shipment to the field. Alternatively, in another embodiment, the first side 14 of the sleeve 12 is tightened onto the first pipe section 28a at the plant with permanent strapping (not shown). In yet another embodiment, the first side 14 of the sleeve 12 is tightened onto the first pipe section 28a at the plant with a cinch-type band (not shown), and the sleeve 12 is then welded on the outer edge of the overlap and the cinch band is then removed.

The bell 16 of sleeve 12 is adapted to slidably receive in an axial direction an adjacent second pipe section 28b in the field. In this way, the coupling 10 preferably creates a fluid and/or soil tight seal between the adjacent ends of spiral corrugated pipe 28a, 28b to reduce or substantially eliminate infiltration or exfiltration within the conduit formed by the interconnected spiral corrugated pipe ends. In addition, since the coupling 10 is formed around the first pipe section 28a at the site of manufacture and the second pipe section 28b is joined to the coupling 10 in the field, the present invention minimizes the time and manpower required to interconnect adjacent sections of pipe in the field as opposed to prior art couplings which required both pipe sections to be simultaneously coupled in the field.

As shown most clearly in FIG. 1B, the first side 14 of coupling 10 has an inner diameter which is slightly larger than the outer diameter of the first pipe section 28a. The annular corrugation 18 of first side 14 cooperatively engages one of the annular corrugations of first pipe section 28a to form an interconnection between the coupling 10 and the first spiral corrugated pipe end 28a at the site of manufacture.

With further reference to FIG. 1B, the bell 16 of sleeve 12 preferably has an inner diameter, defined by smooth wall 32, which is slightly larger that the outer diameter of second pipe section 28b. In this way, bell 16 is adapted to slidably receive the second pipe section 28b in an axial direction. In use, the coupling 10 is formed about the first spiral corrugated pipe section end 28a during production such that only this connection of the bell 16 with the second pipe section 28b is required in the field.

Depending on the infiltration and exfiltration requirements of the pipe interconnection, the abutting relationship of the first and second pipe section ends 28a, 28b may establish the necessary fluid and/or soil tight seal at the interconnection of pipe sections 28a, 28b with the coupling 10. To further provide a tight seal at the coupling 10, it is contemplated that an annular fluted gasket 40, made from any suitable resilient material, is placed about the circumference of the second pipe section 28b to be inserted into bell 16 such that the fluted gasket 40 forms a seal with the inner wall 32 of bell 16 of coupling 10 as the second pipe section 28b is slidably received within the bell 16. It is also contemplated that a commercially available standard sealant (not shown) may be used between the annular corrugation 18 of first side 14 of coupling 10 and the first pipe section 28a for improved infiltration or exfiltration reduction.

Figure 1C:
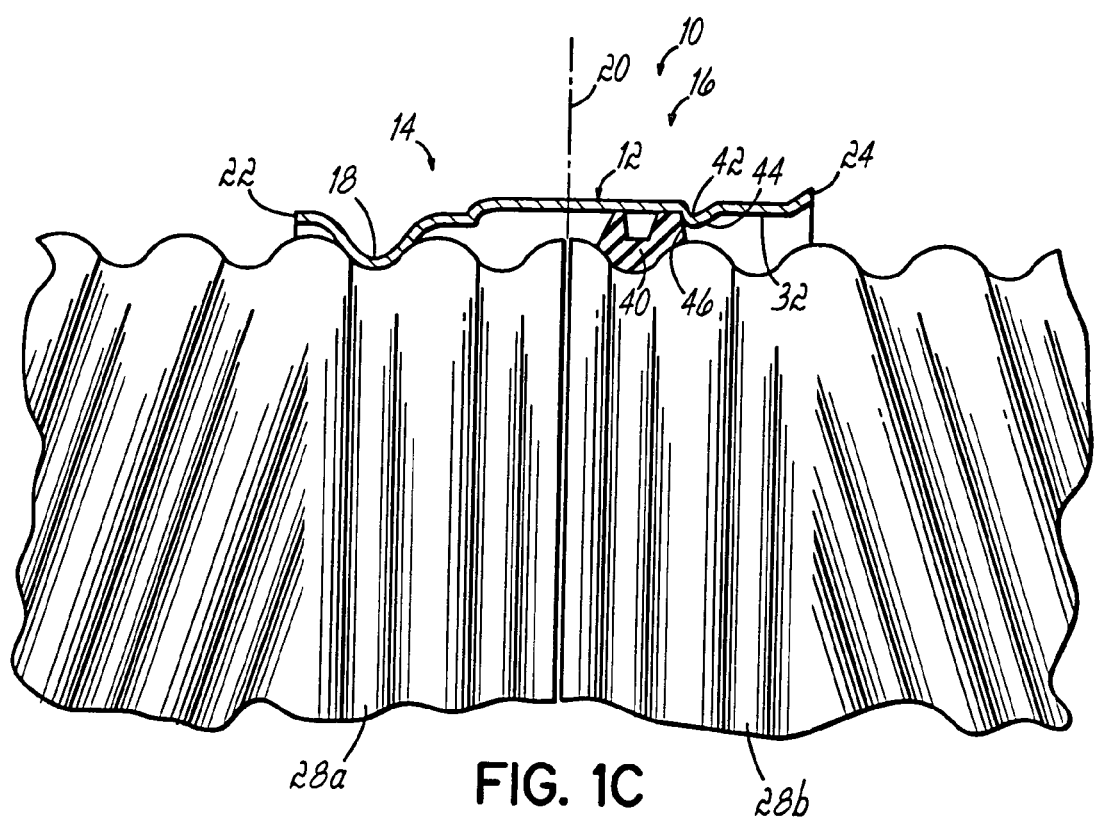
FIG. 1C is a cutaway view of a coupling of the present invention depicting an inwardly extending annular ridge monolithic with and circumferential about the inner surface of the coupling.

As depicted in FIG. 1C, the bell 16 of the coupling 10 may also include a continuous radially inwardly directed annular projection 42 which has an inner diameter slightly larger than the outer diameter of the second pipe section 28b. The annular projection 42 will permit the joint to be assembled between coupling 10 and pipe section ends 28a, 28b, and will provide additional restraint of the assembled pipe section ends 28a, 28b from separating in the field. The annular projection 42 includes a gentle entry side angle 44 disposed proximal to free edge 24 of bell 16, and a steep back angle 46 disposed distally to free edge 24 of bell 16. In this way, as the second pipe section 28b is slidably received by bell 16 of coupling 10, the gentle entry side angle 44 permits the compressed fluted gasket 40 to slide over the annular projection 42 and fill the annular space between the inner surface 32 of bell 16 and the outer diameter of second pipe section 28b. Once second pipe section 28b is interconnected with bell 16, the steep back angle 46 creates a stop to engage the compressed fluted gasket 40 and prevent disengagement of the assembled joint.

Figure 2A:
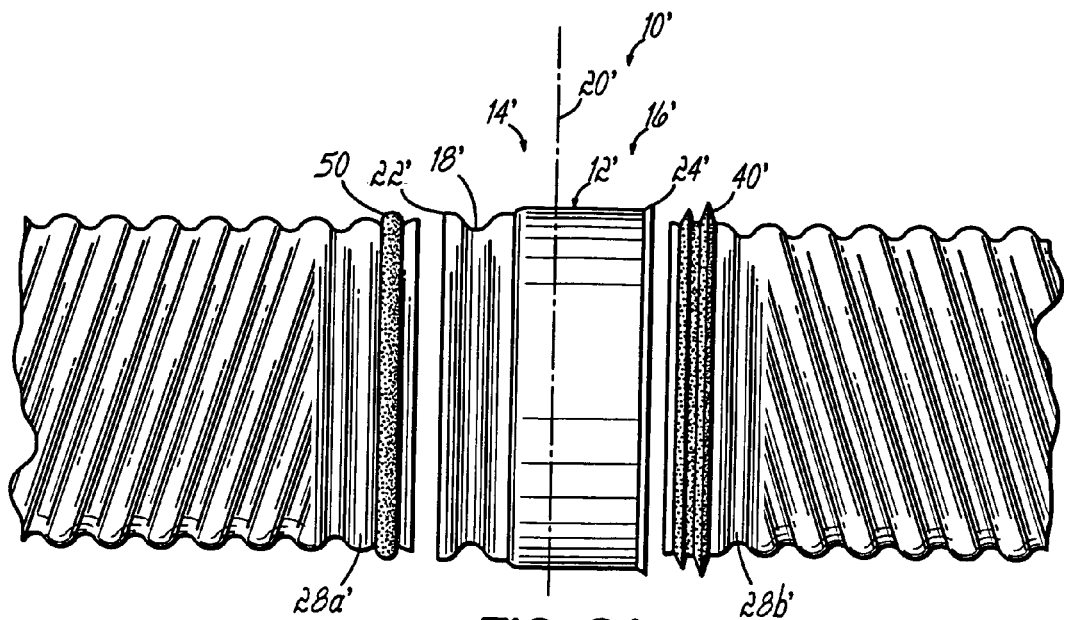
FIG. 2A is a perspective view of a coupling of the present invention in the environment of first and second sections of spiral corrugated pipe depicting an O-ring gasket disposed about the first end of spiral corrugated pipe and a fluted gasket disposed about the second end of spiral corrugated pipe.
Figure 2B:
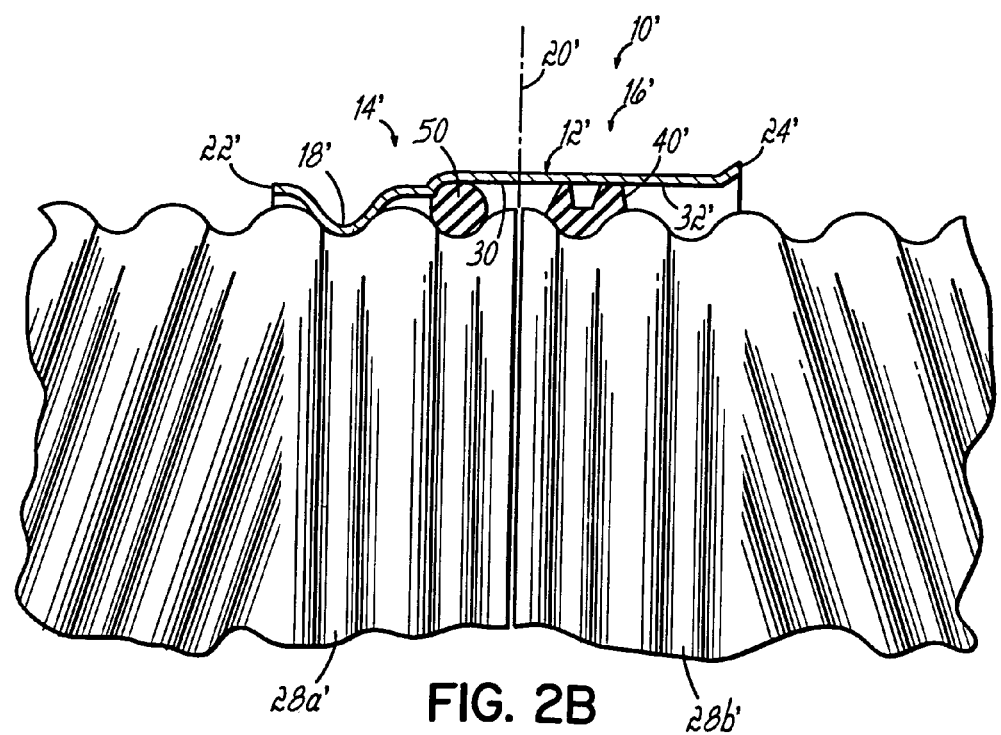
FIG. 2B is a cutaway view of a coupling of the present invention in the environment of first and second sections of spiral corrugated pipe depicting an O-ring gasket disposed about the circumference of a first end of spiral corrugated pipe and a fluted gasket disposed about the circumference of a second end of spiral corrugated pipe.

Referring now to an alternative embodiment shown in FIGS. 2A and 2B, a coupling 10' is shown including a generally cylindrically shaped sleeve 12' having a first side 14' which defines a substantially annular corrugation 18' extending between a midline 20' of the sleeve 12' and a free edge 22' of the first side 14'. A second side in the form of a bell 16' defines a non-corrugated section of the sleeve 12' which extends substantially between the midline 20' and a free edge 24' of the sleeve 12'. The annular corrugation 18' of the first side 14' cooperatively engages a first pipe section 28a' and the bell 16' is adapted to slidably receive a second pipe section 28b' in an axial direction. Further, a sealant (not shown) may be used between the first side 14' and the first pipe section 28a' to reduce infiltration or exfiltration. To further provide a tight seal at the joint, it is contemplated that an annular fluted gasket 40', made from any suitable resilient material, is placed about the circumference of the second pipe section 28b' such that the fluted gasket 40' forms a seal with the inner wall 32' of the bell 16' of the coupling 10' as the second pipe section 28b' is slidably received within the bell 16'. Additionally, an O-ring gasket 50 made from any suitable resilient material, substantially having an "O" shape end and a circular cross-section, is disposed circumferentially about an annular corrugation 52 located on the first pipe section 28a'. This O-ring 50 abuts an inner surface 30 of first side 14' coupling 10' in order to form a soil tight and/or fluid tight seal.

Figure 3A:
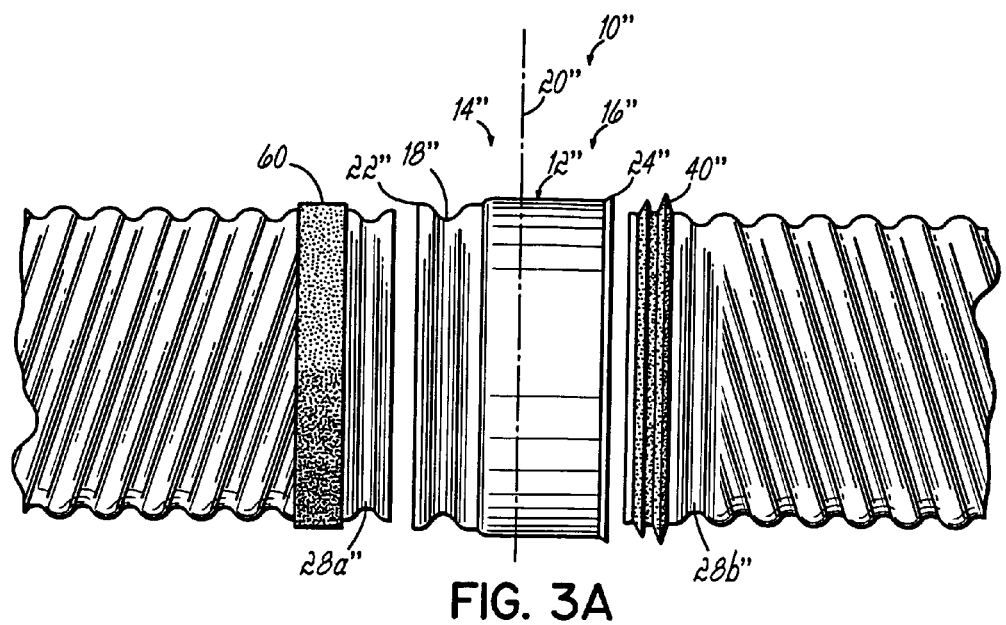
FIG. 3A is a perspective view of a coupling of the present invention in the environment of first and second sections of spiral corrugated pipe depicting a flat gasket disposed about a first end of spiral corrugated pipe and a fluted gasket disposed about a second end of spiral corrugated pipe.
Figure 3B:
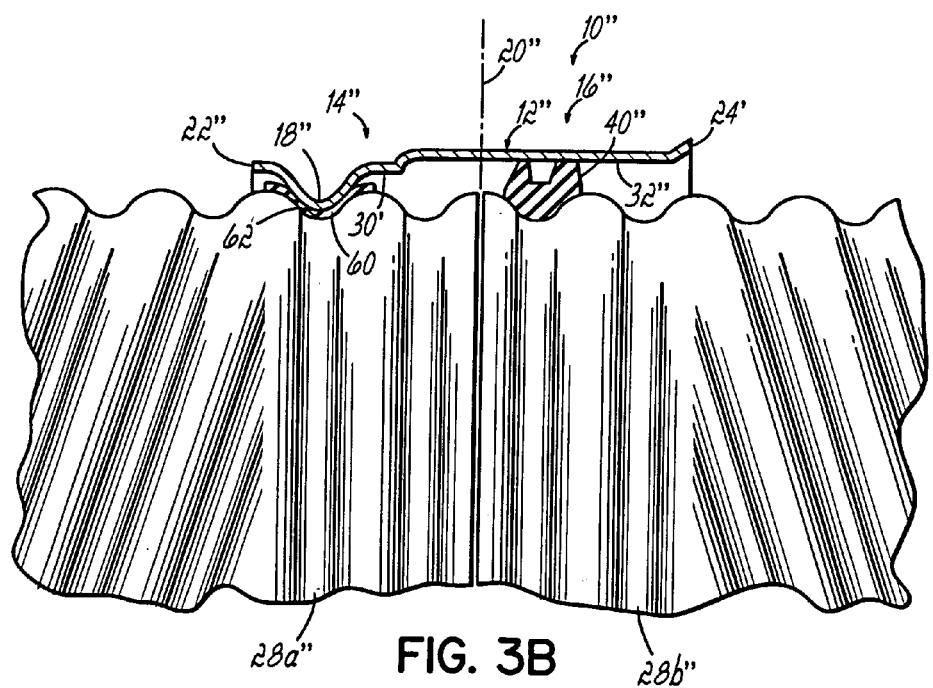
FIG. 3B is a cutaway view of a coupling of the present invention in the environment of first and second sections of spiral corrugated pipe depicting a flat gasket disposed about the circumference of a first end of spiral corrugated pipe and a fluted gasket disposed about the circumference of a second end of spiral corrugated pipe.

Referring to an alternative embodiment shown in FIGS. 3A and 3B, a coupling 10" is shown including a generally cylindrically shaped sleeve 12" having a first side 14" which defines a substantially annular corrugation 18" extending between a midline 20" of the sleeve 12" and a free edge 22" of the first side 14". A second side in the form of a bell 16" defines a non-corrugated section of the sleeve 12" which extends substantially between the midline 20" and a free edge 24" of the sleeve 12". The annular corrugation 18" of the first side 14" cooperatively engages a first pipe section 28a" and the bell 16" is adapted to slidably receive a second pipe section 28b" in an axial direction. Further, a sealant (not shown) may be used between the first side 14" and the first pipe section 28a" to reduce infiltration or exfiltration. To further provide a tight seal at the joint, it is contemplated that an annular fluted gasket 40", made from any suitable resilient material, is placed about the circumference of the second pipe section 28b" such that the fluted gasket 40" forms a seal with the inner wall 32" of the bell 16" of the coupling 10" as the second pipe section 28b" is slidably received within the bell 16". Additionally, a flat gasket 60, having a rectangular cross-section and made from any suitable resilient material, is disposed circumferentially about an annular corrugation 62 located on the first pipe section 28a". This flat gasket 60 abuts an inner surface 30' of first side 14" of coupling 10" in order to form a soil-tight and/or fluid-tight seal.

Those skilled in the art will appreciate that couplings 10, 10' and 10" are particularly adapted for interconnecting adjacent ends of corrugated pipe and are readily installable in the field without extensive manipulation of the pipe ends. By attaching the coupling to the first pipe section at the manufacturing site and only joining the second pipe section in the field, the present invention reduces the complexity of couplings of the prior art which required simultaneous interconnection of both pipe sections in the field. The couplings 10, 10' and 10" do not require complicated latching structures or sealants to form a connection at the pipe joint. Moreover, the couplings 10, 10' and 10" provide versatile configurations for addressing different infiltration and exfiltration requirements which may be encountered with various applications.

While the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. For example, while the coupling 10 has been described as preferably being made of metal, other suitable materials are also contemplated without departing from the spirit and scope of the present invention. Additionally, while the present invention is particularly adapted for interconnecting adjacent ends of spiral corrugated pipe, it is also contemplated that sleeve 12 may slidably receive other types of corrugated pipes. Further, while a fluted gasket 40 has been described as being disposed about second pipe section end 28b, it is also contemplated that other types of gaskets may be used. Also, while the second pipe section end 28b has been described as having an annular corrugation, any corrugation configuration may be formed into the second pipe section end 28b. The invention in its broader aspects is therefore not limited to the specific details, representative apparatus and method, and illustrative example shown and described. Accordingly, departures may be made from such details without departing from the spirit or scope of applicant's general inventive concept.

What is claimed is:

1. A pipe coupling for interconnecting adjacent ends of first and second pipe sections, the end of the first pipe section having an annular corrugation, said coupling comprising:

a generally cylindrical metal sleeve having first and second sides, said sleeve being formed from a sheet material and having at least one rigid and radially inwardly directed annular corrugation formed across its width prior to securement of said sleeve about the first pipe section end, said annular corrugation being located adjacent a free end of said sleeve on said first side thereof and defining an innermost diameter section of said sleeve;

said annular corrugation being disposed on said first side of said sleeve so as to be oriented perpendicular to a longitudinal axis of said sleeve and configured to cooperatively engage the annular corrugation on the first pipe section end when said sheet is wrapped around the first pipe section end to secure said sleeve on the first pipe section end and thereby prevent separation of said sleeve from the first pipe section; and an elongated tubular bell on said second side of said sleeve having an inner wall of substantially constant diameter along a substantial length thereof and being adapted to slidably receive in an axial direction the second pipe section end within said sleeve, with no portion of said sleeve extending radially inwardly between said annular corrugation and said bell so that the first and second pipe section ends are capable of abutting;

whereby said coupling is adapted to interconnect said adjacent ends of said first and second pipe sections.

2. The coupling of claim 1 wherein said bell includes a circumferential outwardly extending flange disposed about an outer edge of said bell.

3. The coupling of claim 1 wherein the inner diameter of said bell is greater than the outer diameter of said second pipe section.

4. In combination, a pipe coupling and first and second pipe sections, the end of the first pipe section having an annular corrugation, and said coupling comprising:

a generally cylindrical metal sleeve having first and second sides, said sleeve being formed from a sheet material and having at least one rigid and radially inwardly directed annual corrugation formed across its width prior to securement of said sleeve about the first pipe section end, said annular corrugation being located adjacent a free end of said sleeve on said first side thereof and defining an innermost diameter section of said sleeve;

said annular corrugation being disposed on said first side of said sleeve so as to be oriented perpendicular to a longitudinal axis of said sleeve and configured to cooperatively engage the annular corrugation on the first pipe section end when said sheet is wrapped around the first pipe section end to secure said sleeve on the first pipe section end and thereby prevent separation of said sleeve from the first pipe section; and an elongated tubular bell on said second side of said sleeve having an inner wall of substantially constant diameter along a substantial length thereof and being adapted to slidably receive in an axial direction the second pipe section end within said sleeve, with no portion of said sleeve extending radially inwardly between said annular corrugation and said bell so that the first and second pipe section ends are capable of abutting;

whereby said coupling interconnects said adjacent ends of said first and second pipe sections.

5. The combination of claim 4 further comprising a first gasket.

6. The combination of claim 5 wherein said first gasket is a fluted gasket disposed circumferentially about an annular corrugation of said second pipe section, said fluted gasket adapted to contact and confront an inner surface of said bell when said second pipe section is slidably received by said bell.

7. The combination of claim 6 further comprising a second gasket.

8. The combination of claim 7, wherein said second gasket is an O-ring disposed circumferentially about an annular corrugation of said first pipe section, and wherein said O-ring contacts and confronts the inner surface of said first side of said sleeve when said first side cooperatively engages said first pipe section.

9. The combination of claim 7, wherein said second gasket is a flat gasket disposed circumferentially about an annular corrugation of said first pipe section, and wherein said flat gasket contacts and confronts the inner surface of said first side of said sleeve when said first side cooperatively engages said first pipe section.

10. The combination of claim 4 wherein said bell includes a circumferential outwardly extending flange disposed about an outer edge of said bell.

11. The combination of claim 4 wherein the inner diameter of said bell is greater than the outer diameter of said second pipe section.

12. The combination of claim 4 further comprising a sealant disposed on said first side of said sleeve, for adhering said first side of said sleeve to said first pipe section.

13. A method of interconnecting adjacent ends of first and second pipe sections, the end of the first pipe section having an annular corrugation, the method comprising the steps of:
    providing a metal sheet;
    forming a rigid corrugation across the width of said sheet prior to securement of said sleeve about the first pipe section end;
    wrapping said sheet into a cylindrical metal sleeve including a first side having said rigid corrugation oriented radially inwardly and perpendicular to a longitudinal axis of said sleeve and a second side having an elongated tubular bell with an inner wall of substantially constant diameter along a substantial length thereof, said annular corrugation being located closer to a free end of said sleeve on said first side thereof than a free end of said sleeve on said second side thereof;
    securing said sleeve about the first pipe section end during the wrapping step by cooperatively engaging said rigid corrugation of said sleeve with the annular corrugation of the first pipe section end to thereby prevent separation of said sleeve from the first pipe section; and
    slidably receiving in an axial direction the second pipe section end within said bell to interconnect the adjacent ends of the first and second pipe sections, with no portion of said sleeve extending radially inwardly between said annular corrugation and said bell so that the first and second pipe section ends are capable of abutting.

14. The method of claim 13 wherein said sheet is wrapped into said cylindrical sleeve and said first side of said sleeve is secured to said first section of pipe at a first location.

15. The method of claim 14 wherein said second pipe section is slidably received by said bell at a second location remote to said first location.

16. A pipe coupling for interconnecting adjacent ends of first and second pipe sections, the end of the first pipe section having an annular corrugation, said coupling comprising;
    a generally cylindrical metal sleeve having first and second sides, said sleeve being formed from a sheet material and having at least one rigid and radially inwardly directed annular corrugation formed across its width prior to securement of said sleeve about the first pipe section end, said annular corrugation being located adjacent a free end of said sleeve on said first side thereof and defining an innermost diameter section of said sleeve;
    said annular corrugation being disposed on said first side of said sleeve so as to be oriented perpendicular to a longitudinal axis of said sleeve and configured to cooperatively engage the annular corrugation on the first pipe section end when said sheet is wrapped around the first pipe section end to secure said sleeve on the first pipe section end and thereby prevent separation of said sleeve from the first pipe section;
    an elongated tubular bell on said second side of said sleeve being adapted to slidably receive in an axial direction the second pipe section end within said sleeve, with no portion of said sleeve extending radially inwardly between said annular corrugation and said bell so that the first and second pipe section ends are capable of abutting;
    a gasket adapted to be disposed circumferentially about said second pipe section, said gasket adapted to contact and confront an inner surface of said bell when said second pipe section is slidably received by said bell; and
    a radially inwardly directed annular projection disposed about the inner diameter of said bell, said annular projection adapted to engage said gasket and retain said second pipe section end within said bell;
    whereby said coupling is adapted to interconnect said adjacent ends of said first and second pipe sections.

17. The coupling of claim 16 wherein said radially inwardly directed annular projection includes a gentle entry side angle on one side of said annular projection.

18. The coupling of claim 17 wherein said radially inwardly directed annular projection includes a steep back angle on an opposite side of said annular projection.

19. The coupling of claim 16 wherein said bell includes a circumferential outwardly extending flange disposed about an outer edge of said bell.

20. The coupling of claim 16 wherein the inner diameter of said bell is greater than the outer diameter of said second pipe section.

21. In combination, a pipe coupling and first and second pipe sections, the end of the first pipe section having an annular corrugation, and said coupling comprising:
    a generally cylindrical metal sleeve having first and second sides, said sleeve being formed from a sheet material and having at least one rigid and radially inwardly directed annular corrugation formed across its width prior to securement of said sleeve about the first pipe section end, said annular corrugation being located adjacent a free end of said sleeve on said first side thereof and defining an innermost diameter section of said sleeve;

said annular corrugation being disposed on said first side of said sleeve so as to be oriented perpendicular to a longitudinal axis of said sleeve and configured to cooperatively engage the annular corrugation on the first pipe section end when said sheet is wrapped around the first pipe section end to secure said sleeve on the first pipe section end and thereby prevent separation of said sleeve from the first pipe section;

an elongated tubular bell on said second side of said sleeve being adapted to slidably receive in an axial direction the second pipe section end within said sleeve, with no portion of said sleeve extending radially inwardly between said annular corrugation and said bell so that the first and second pipe section ends are capable of abutting;

a first gasket disposed circumferentially about said second pipe section, said gasket contacting and confronting an inner surface of said bell when said second pipe section is slidably received by said bell; and a radially inwardly directed annular projection disposed about the inner diameter of said bell, said annular projection engaging said first gasket and retaining said second pipe section end within said bell;

whereby said coupling interconnects said adjacent ends of said first and second pipe sections.

22. The combination of claim 21 wherein said first gasket is a fluted gasket disposed circumferentially about an annular corrugation of said second pipe section.

23. The combination of claim 22 further comprising a second gasket.

24. The combination of claim 23, wherein said second gasket is an O-ring disposed circumferentially about an annular corrugation of said first pipe section, and wherein said O-ring contacts and confronts the inner surface of said first side of said sleeve when said first side cooperatively engages said first pipe section.

25. The combination of claim 23, wherein said second gasket is a flat gasket disposed circumferentially about an annular corrugation of said first pipe section, and wherein said flat gasket contacts and confronts the inner surface of said first side of said sleeve when said first side cooperatively engages said first pipe section.

26. The combination of claim 21 wherein said radially inwardly directed annular projection includes a gentle entry side angle on one side of said annular projection.

27. The combination of claim 26 wherein said radially inwardly directed annular projection includes a steep back angle on an opposite side of said annular projection.

28. The combination of claim 21 wherein said bell includes a circumferential outwardly extending flange disposed about an outer edge of said bell.

29. The combination of claim 21 wherein the inner diameter of said bell is greater than the outer diameter of said second pipe section.

30. The combination of claim 21 further comprising a sealant disposed on said first side of said sleeve, for adhering said first side of said sleeve to said first pipe section.

* * * * *